(12) United States Patent
Ormond et al.

(10) Patent No.: US 10,579,312 B2
(45) Date of Patent: Mar. 3, 2020

(54) MFP EXECUTIVE DASHBOARD

(71) Applicant: Toshiba TEC Kabushiki Kaisha, Shinagawa-ku (JP)

(72) Inventors: Louis Ormond, Irvine, CA (US); Marianne Kodimer, Huntington Beach, CA (US); Silvy Wilson, Rancho Santa Margarita, CA (US); Rashmi Brahma, Irvine, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/188,425

(22) Filed: Nov. 13, 2018

(65) Prior Publication Data

US 2019/0146728 A1    May 16, 2019

Related U.S. Application Data

(60) Provisional application No. 62/584,446, filed on Nov. 10, 2017.

(51) Int. Cl.
| | |
|---|---|
| *G06F 3/12* | (2006.01) |
| *G06Q 40/06* | (2012.01) |
| *G06T 11/60* | (2006.01) |

(52) U.S. Cl.
CPC ............ *G06F 3/1207* (2013.01); *G06F 3/123* (2013.01); *G06F 3/1259* (2013.01); *G06F 3/1285* (2013.01); *G06Q 40/06* (2013.01); *G06T 11/60* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2012/0271472 A1* | 10/2012 | Brunner ................ | G06F 1/3209 700/295 |
| 2014/0118775 A1* | 5/2014 | Motamed ............. | G06Q 10/063 358/1.15 |

* cited by examiner

*Primary Examiner* — Henok Shiferaw
(74) *Attorney, Agent, or Firm* — Ulmer & Berne LLP

(57) ABSTRACT

A system and method for providing analytics on cost data and device state data for multifunction peripherals includes a document processing engine, a network interface and an intelligent controller having a processor and associated memory. The memory stores cost data corresponding to device usage costs of one or more MFPs. A device monitor monitors of a plurality of device states associated with a document processing engine associated with each MFP. An analytics engine generates a graphical dashboard illustrative of a return on investment in accordance with the cost data and monitored device states. A display generator renders an image of the graphical dashboard. The graphical dashboard is altered in accordance with modified or updated state data acquired over time in accordance with device usage changes or device configuration changes.

18 Claims, 8 Drawing Sheets

MFP EXECUTIVE DASHBOARD

CROSS-REFERENCE TO RELATED APPLICATIONS

This application claims the benefit of U.S. Provisional Application No. 62/584,446 filed Nov. 10, 2017, which is incorporated herein by reference.

TECHNICAL FIELD

This application relates generally to monitoring and configuring of networked devices. The application relates more particularly to monitoring multifunction peripherals, including monitoring device states, usage patterns and costs, relative to different configurations to optimize device usage and minimize costs.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the cost and complexity associated with purchasing and maintaining MFPs, customers often enter into dealer agreements for their devices. A dealer agreement may include leasing and servicing of devices. Costs may be calculated in any number of ways. One popular cost structure includes a per-page charge to the customer for printing, scanning, or faxing of documents. Accordingly, MFPs are typically monitored for usage by the lessee so that the leasing party the MFP can be billed appropriately for their usage. Monitoring is frequently done remotely, via a network connection to a dealer server.

DETAILED DESCRIPTION

Figure 1:
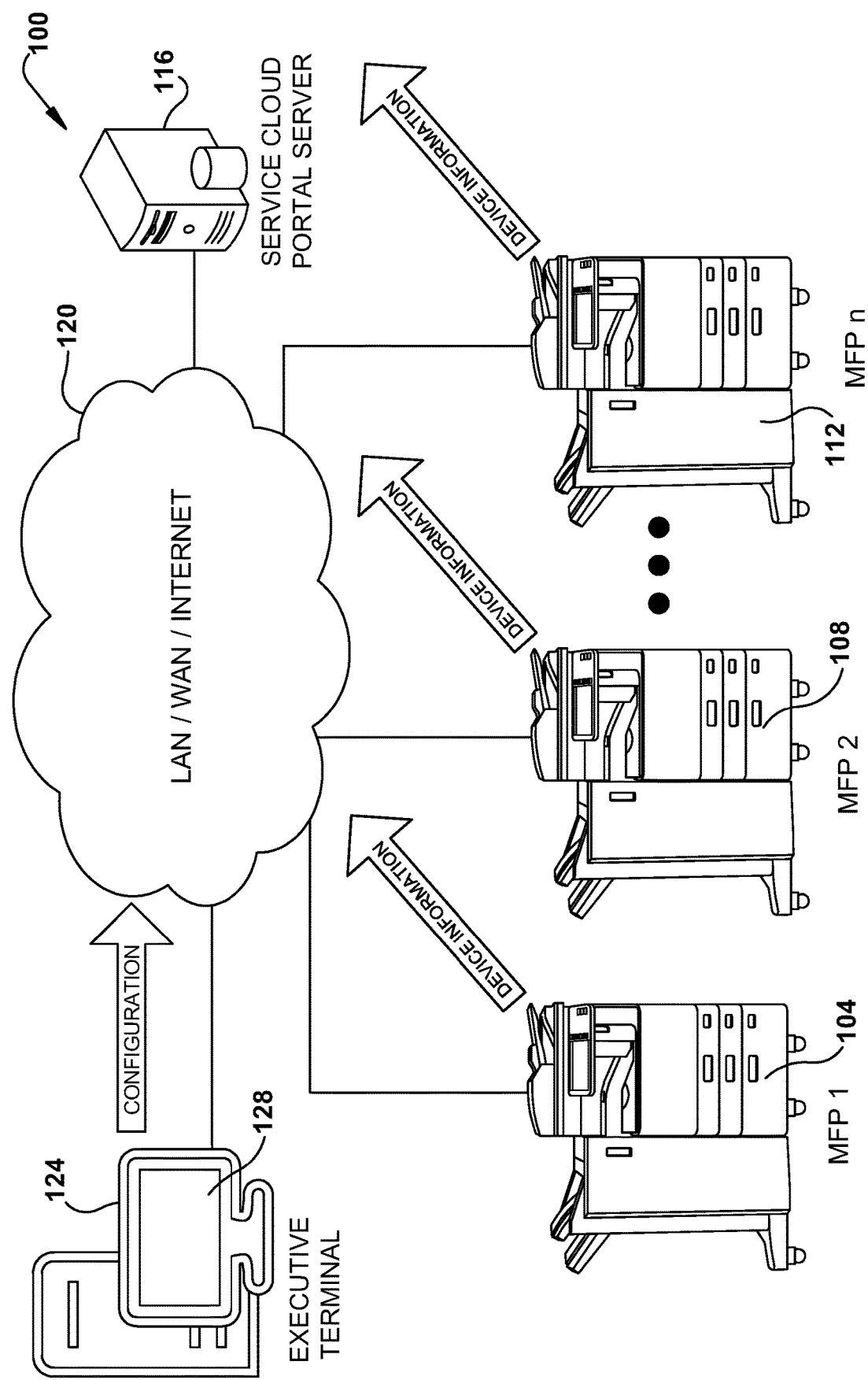
FIG. 1 is an example embodiment of a system for device monitoring and status acquisition to generate an MFP dashboard.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with an example embodiment disclosed herein, a system includes a document processing engine, a network interface and an intelligent controller having a processor and associated memory. The memory stores cost data corresponding to device usage costs of one or more MFPs. A device monitor monitors of a plurality of device states associated with a document processing engine associated with each MFP. An analytics engine generates a graphical dashboard illustrative of a return on investment in accordance with the cost data and monitored device states. A display generator configured to render an image of the graphical dashboard.

In an example embodiment, remote monitoring of MFPs is suitably accomplished by a system such as Toshiba TEC's e-BRIDGE CloudConnect (ECC) which provides comprehensive security and management for networked MFPs. While embodiments disclosed herein are in conjunction with ECC technology, any suitable environment is applicable.

ECC functions to securely and reliably collect operation data transmitted from MFPs over a suitable network connection, such as HTTPS/SSL connection. Only parties from contracted maintenance companies, such as authorized dealers, with valid permission can view the data. ECC provides:

Cloud-based support service for an end-to-end process for monitoring device communications Increased uptime with proactive device status alerts and remote diagnostics Reduce workload with scheduled meter readings and automated supplies delivery Keep machines up to date with the latest firmware and remote data back up Provide stability across your MFP fleet with regular, remote health checks Device monitoring suitably includes cost monitoring and management. Managing costs and reducing waste are two of the challenges businesses face today. A suitable system to reduce costs and improve the productivity of network printing is with PaperCut MF from Toshiba TEC. PaperCut is an enterprise software solution which allows one to easily manage print assets, collect usage data by location and device, identify inefficiency and implement cost recovery and allocation strategies to maximize system productivity and return on investment. Such return on investment may take into account cost of purchasing or leasing an MFP, cost per page of usage, electricity costs, toner or ink costs, human resource costs, such as user time needed for device operations or user time wasted while waiting for document functions to complete.

PaperCut functions to:

Control account, bill or charge every copy, print, scan and faxing

Manage copiers, printers and users from a web interface

Track environmental savings and benefits from device features such as Toshiba TEC's e-STUDIO RD30 eraser unit Report usage and costs by page, by user, cost center/department, device and function Access devices via a log-in or ID/Access card Enforce responsible use print policies, via applied rules, limits and auto-notifications Secure confidential documents and release anywhere In example embodiments herein, device information is acquired, analyzed and formatted not only for a manufacture, dealer or distributer, but also for end users. Example embodiments provide for use to use of ECC data to show updated data on an easily understandable dashboard that calculates a return on investment for various settings on MFP devices. Target audience includes internal executives, dealers or TTEC.

By way of further example, changes in policies will give immediate feedback on their effect on device performance or costs. Filing or hiding of a device policy may create value. Example policies include error tracking, application installations or device security parameters.

A suitable graphical user interface may be generated with any suitable analytics tool configured for discovering and communicating meaningful patterns which can be found in data. An example of an analytics tool includes Microsoft Power BI business analytics tools suitable to generate graphical summaries that are easy to understand.

Analytics turns raw data into insight for making better decisions. Analytics relies on the application of statistics, computer programming, and operations research in order to quantify and gain insight to the meanings of data. It is especially useful in areas which record a lot of data or information.

A dashboard for monitoring MFPs provides system administrators, internal executives, dealers, and manufacturers with usage data for fleets of MFPs. Users can change policies on MFPs and view the effect on device performance or costs. The dashboard presents information in graphical summaries that are easy for users to understand.

Figure 3:
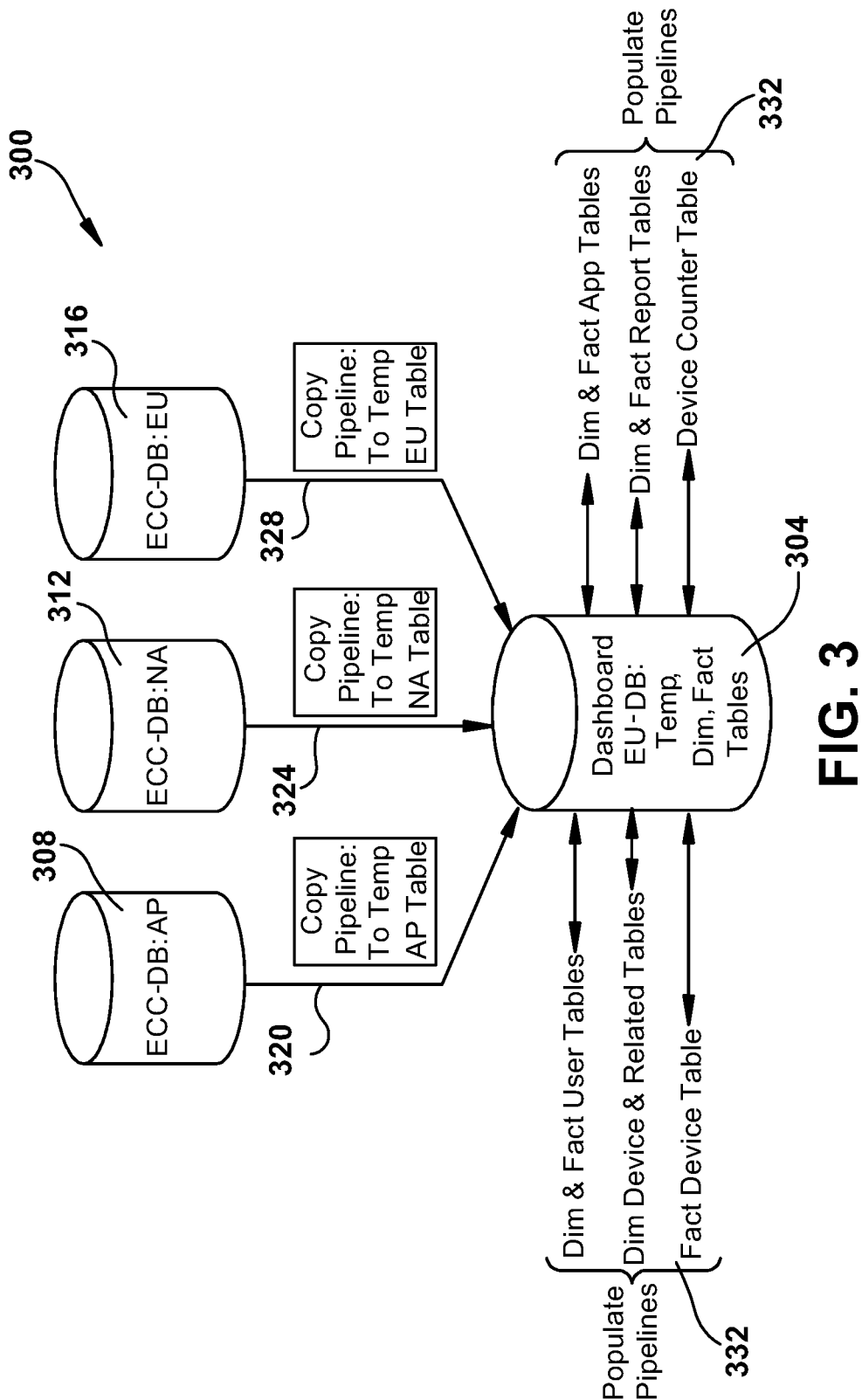
FIG. 3 is a system diagram of an example embodiment of an MFP dashboard database.
Figure 4:
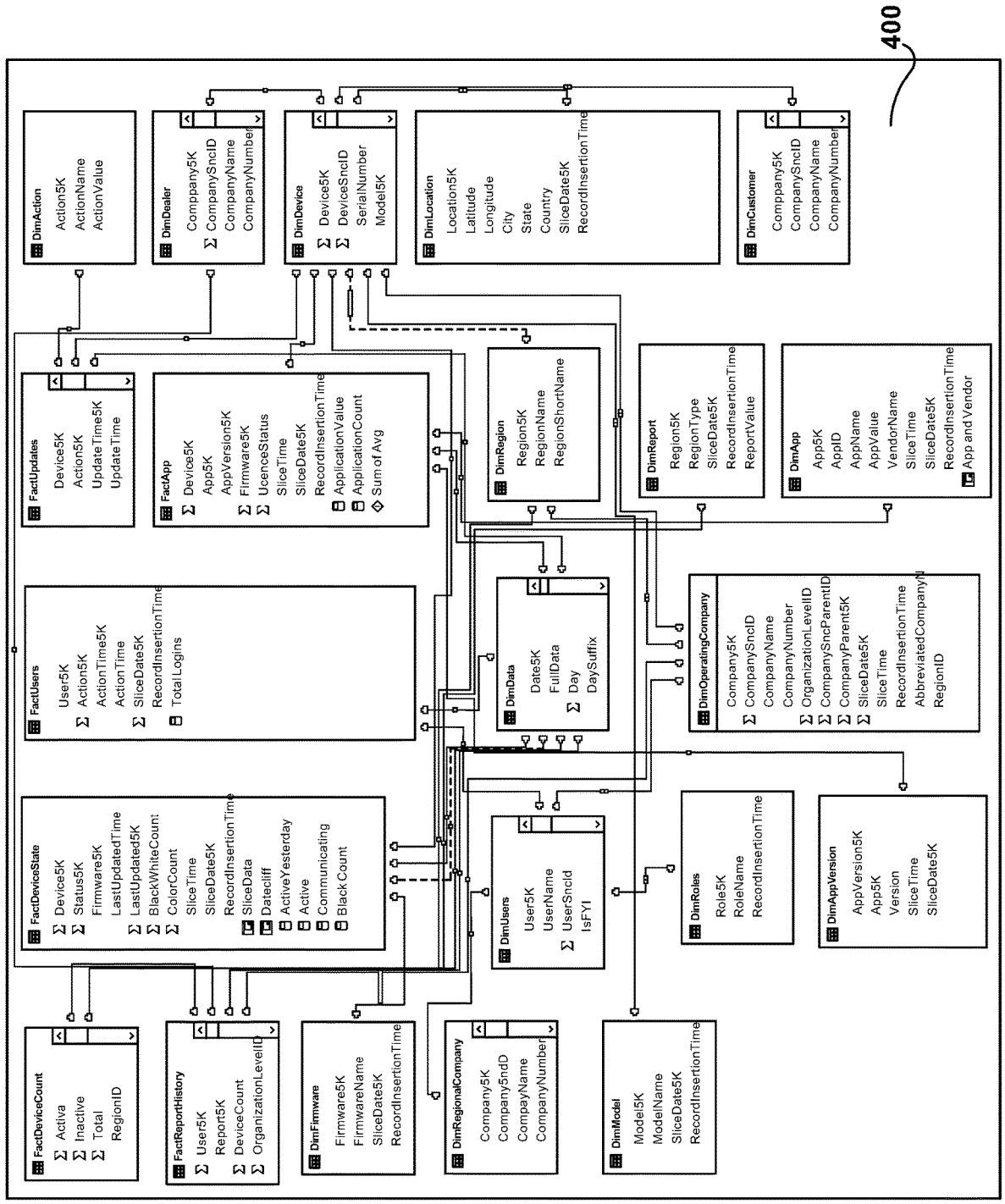
FIG. 4 is diagram of an example embodiment of an MFP dashboard database structure.

Referring to FIGS. 3 and 4, a database where dashboard data for MFPs is collected and stored is presented. The database stores data for presentation to a user via the dashboard interface. Any suitable database suite can be used to store and present the data, for example the Microsoft PowerBI tool suite can be used to organize and present the data to users.

FIG. 1 illustrates an example embodiment of a system 100 for monitoring MFPs to generate an executive dashboard to facilitate for device modification or reconfiguration for optimization or cost control. Included in the example are MFPs 104, 108 and 112 connected to server 116, suitably running a monitoring system such as ECC, suitably with PaperCut and PowerBI, or any other suitable application. MFPs 104, 108 and 112 are in data communication with server 116 via network cloud 120, suitably comprised of a local area network (LAN), wide area network (WAN), which may comprise the Internet, or any suitable combination thereof. Also in communication with network cloud 120 is executive terminal 124. Device information, such as device settings, counter data, paper type, paper levels, ink levels, toner levels, environmental conditions, device location, device configuration, policy settings, and the like is suitably communicated from each MFP 104, 108 and 112 to server 116 for generation of one or more dashboard views, such as dashboard view 128 on a display of executive terminal 128. Modifications to states of one or more MFPs 104, 108 and 112 is suitably accomplished, such as via service cloud portal server 116, executive terminal 124, or any other suitable device, including on a user interface of an MFP 104, 108 and 112 itself. Changes can include user interface changes, device policy settings, software installations, software versions, or the like. Any change made to an MFP 104, 108 and 112 can generate a corresponding adjustment in a dashboard display on executive terminal 124. For example, addition, deletion or substitution of a device policy can immediately, or over time, be reflected on executive terminal 124, showing how such a modification affects a device return on investment.

Figure 2:
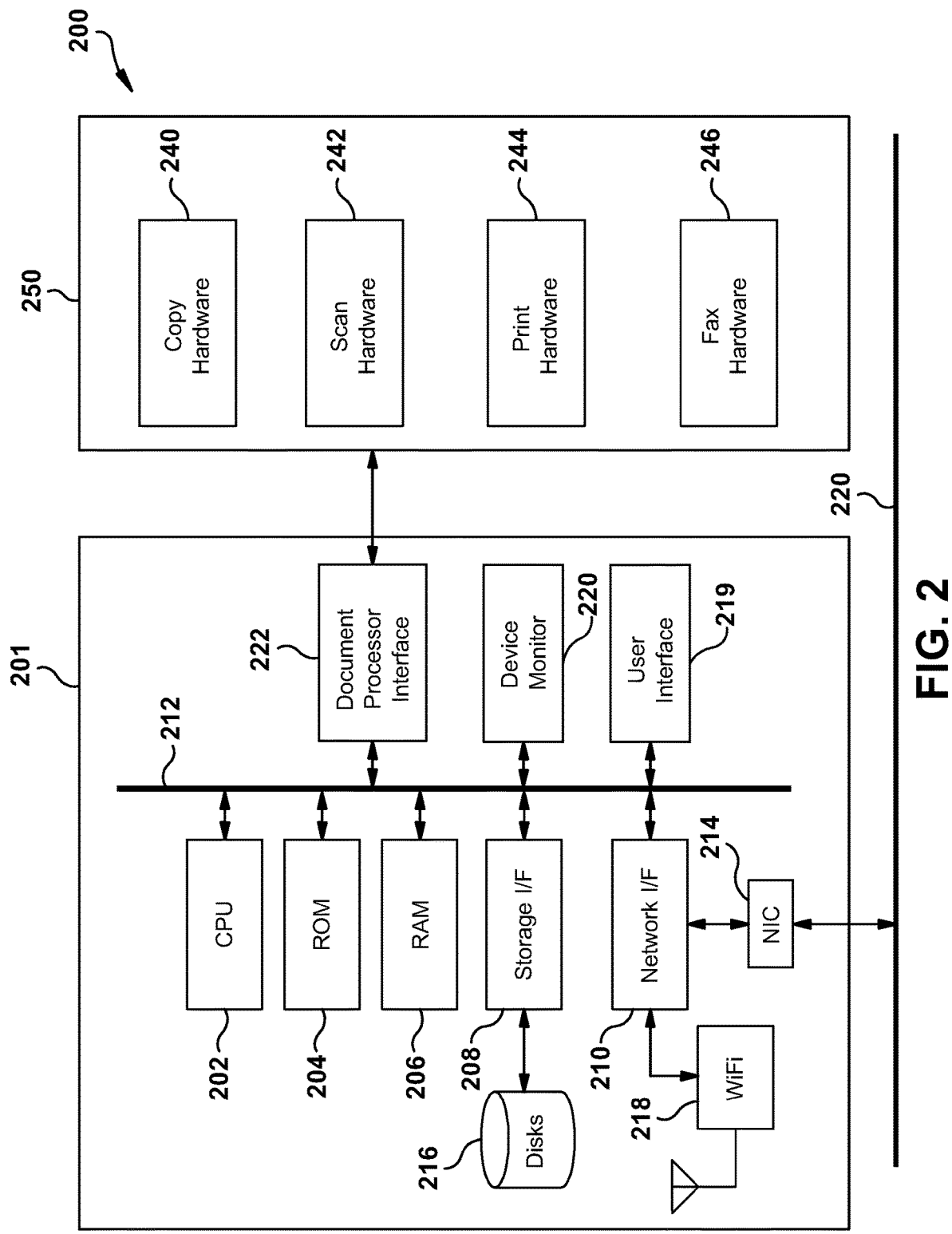
FIG. 2 is a block diagram of an example embodiment of a multifunction peripheral.

Turning now to FIG. 2 illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Thus, an MFP can itself function as a cloud server with the capabilities described herein. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 219 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like. Processor 202 is also in data communication with a device monitor 220 to secure device state information. Device monitor 220 is suitably comprised of one or more systems for monitoring of an MFP machine state. Example states include types of paper loaded, quantities of paper loaded, types of ink of toner, levels of ink or toner, error conditions, device usage parameters, environmental sensors, geolocation data, time or date data, or the like. Device states further comprise software installed, software versions installed, hardware options, hardware modifications, device settings or device policies.

Also in data communication with data bus 212 is a document processor interface 222 suitable for data communication with MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

FIG. 3 is an example embodiment of a system for monitoring of MFPs employing databases 304, 308, 312 and 316. Toshiba ECC data is collected in three regions throughout the world: Asia Pacific (AP) in database 308, North America (NA) in database 312, and the European Union (EU) in database 316. The data from these regions is suitably stored in databases locally in these regions. The dashboard generator has a set of three Copy Pipelines 320, 324 and 328 that transfer data from the regional databases to a dashboard data warehouse stored in the EU region database 304. The Copy Pipelines can be scheduled to run periodically, for example once every 24 hours, to transfer all ECC updates from the three regions to the dashboard data warehouse. The data transferred from each region can be placed in temporary tables for further processing. The dashboard includes a set of six Populate Pipelines 332 that take the data from temporary tables and populate a set of Dimension (Dim) and Fact tables also located in the dashboard data warehouse.

The database tables are suitably set up in a "snow-flaked" structure as illustrated in schema 400 FIG. 4. The PowerBI application presents a set of reports that include graphs and charts that draw from the dashboard data warehouse Dim and Fact tables to show the activity and status of the ECC across all regions, which can drill down into the regional and customer data. The reports can include the following types of reports:

Regional Usage
Dealer Usage
ECC Usage
Customer Usage

Figure 5:
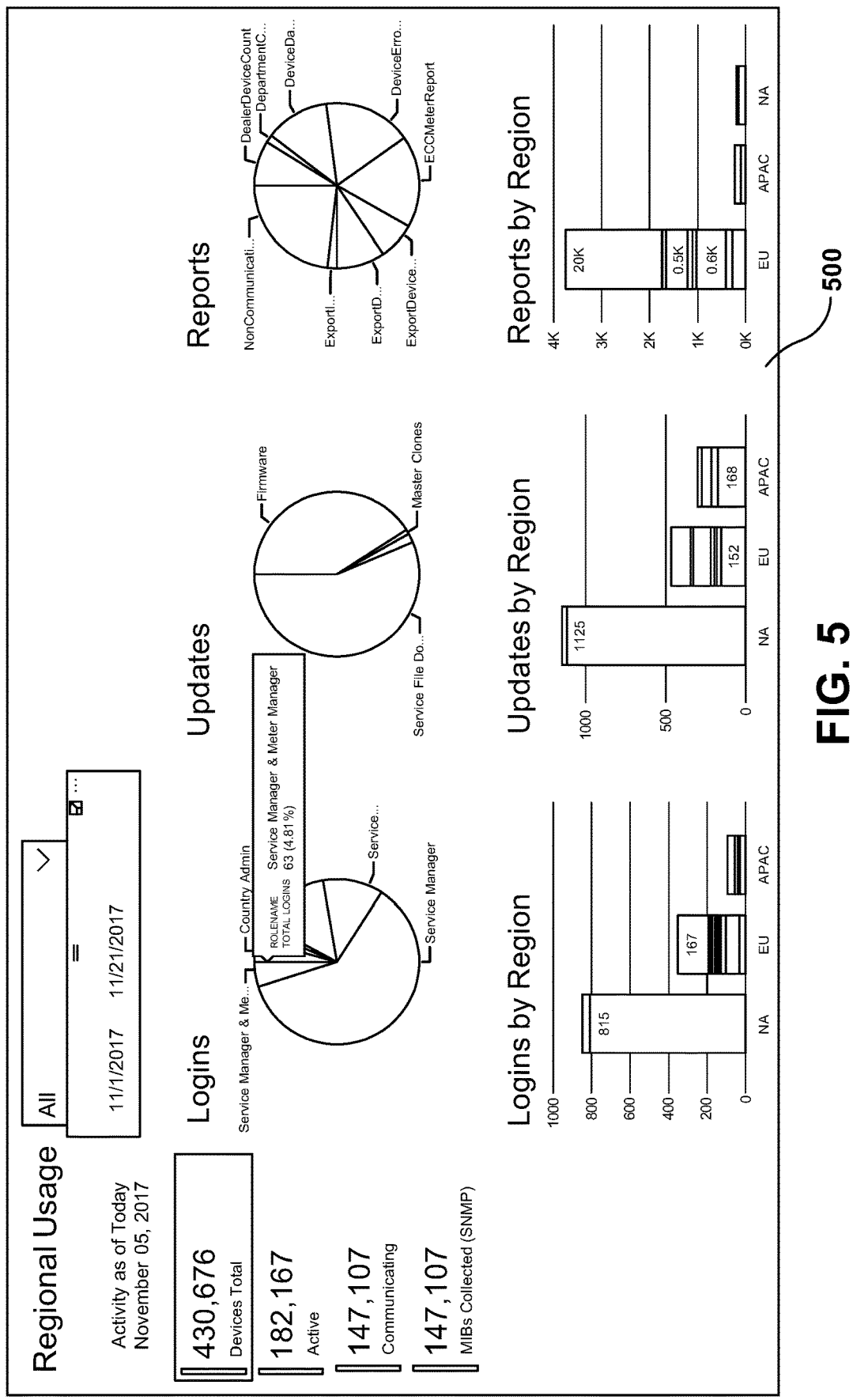
FIG. 5 is a screenshot of an example regional usage report of the MFP dashboard.

Referring to FIG. 5, an example Regional Usage report 500 provides a view of the overall ECC activity across all regions. The Activity as of Today area of the report provides data information on the devices by region, or combined across all regions by querying the dashboard data warehouse and includes the following:

Devices Total—Provides the total devices including both active and inactive.
Active—Provides the number of active devices.
Communicating—Provides the number of devices recently communicating to the ECC databases in each region.
MIBs Collected (SNMP)—Provides the count of devices for which MIB data has been recently collected.

The Logins pie chart provides the ratio of the various users by role who logged in the system. The user roles include the following:

Customer
Senior Service Engineer
Service Engineer
Service Manager
Meter Manager
Service Manager & Meter Manager
Regional firmware Admin
Country Firmware Admin
Country ITC
Regional ITC
Auditor
Country Admin
Regional Admin
National Account Team The Logins by Region stacked bar chart shows the count of logins across all users for the specified region. Selecting a slice of the Logins pie chart will show the stacked bar chart with only the logins by region for the particular user role.

The Updates pie chart provides the ratio of the various device operations performed by the system. The users include the following:

UI Configurations
Applications
Master Clones
Service File Downloads
Firmware
Licenses The Updates by Region stacked bar chart shows the count of updates across all update operations for the specified region. Selecting a slice of the Update pie chart will show the stacked bar chart with only the count of update operations by region for the operation. The Reports graphic provides information of what reports have been sent out to users and FTP repositories by ECC. These reports provide information on the following:

Active/Inactive
Counters
Data
Dealer List
Meter
Non-Communicating Devices
SNMP

Figure 6:
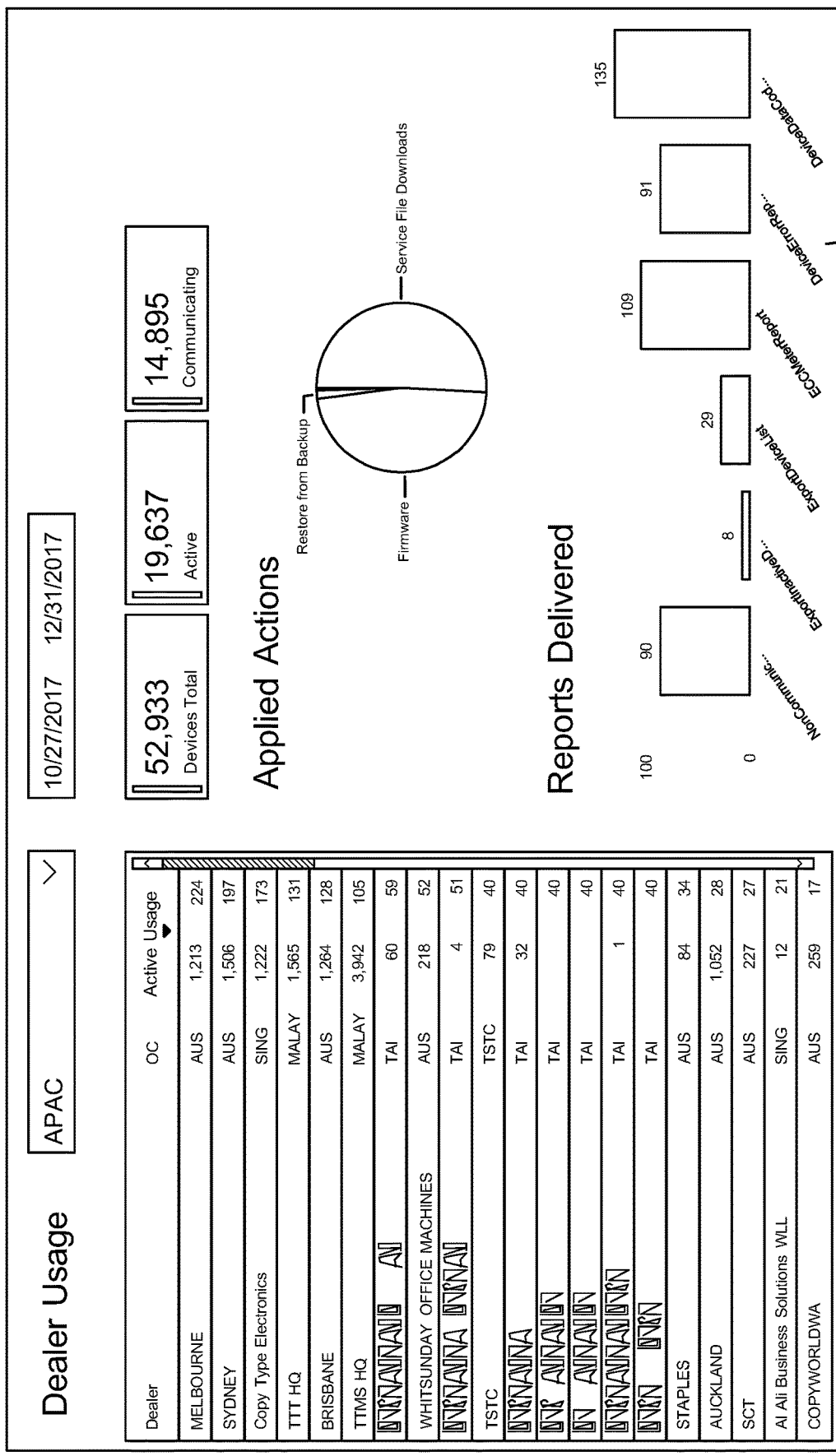
FIG. 6 is a screenshot of an example dealer usage report of the MFP dashboard.

Referring now to FIG. 6, an example Dealer Usage report 600 provides a view of the overall ECC activities by dealer. A Show Dealer Usage table provides a list by dealer and country of the number of active devices in each dealership and their usage. The usage value is derived from the number of updates to devices and number of reports scheduled by the selected dealer. An Applied Actions pie chart shows the Update activity by dealer. Including the following:

UI Configurations
Applications
Master Clones
Service file Downloads
Firmware
Licenses The Reports Delivered graph shows the reports delivered by dealer including the following:

Active/Inactive
Counters
Data
Dealer List
Meter
Non-Communicating Devices
SNMP

Figure 7:
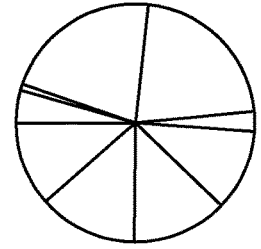
FIG. 7 is a screenshot of an example ECC value report of the MFP dashboard.

Referring now to FIG. 7, an example ECC value report 700 provides a view of the Estimated Value of ECC services provided. The Updates, Reports, and Application activities are presented with a calculated value for each. The Updates Value shows an area chart presenting the relative sizes of the value delivered of each type of ECC update. Updates are valued at 15 minutes for each successful update. The Reports Value shows an area chart presenting the relative sizes of the value delivered for each type of ECC report. An Installed Applications Value pie chart shows the relative sizes of the value delivered of each type of Application installed on devices. Installed Applications can be valued at 1 each, essentially showing a count of installed applications. Applications can be weighted differently if Applications are sold rather than provided for free. The Value Items listing provides the summary each for the Reports, Updates and Application values delivered, as measured by the relative contributions of each item and their count.

Figure 8:
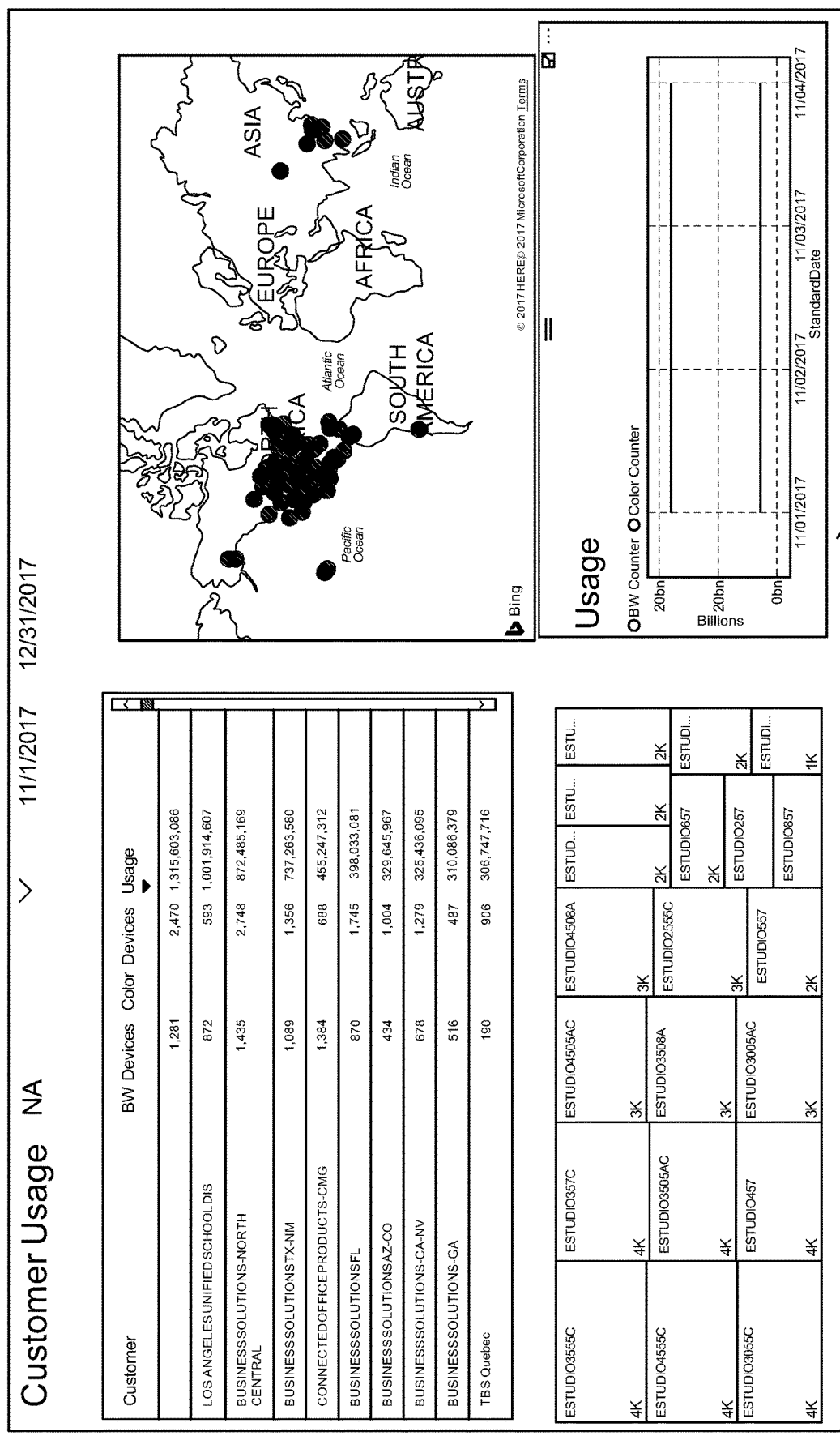
FIG. 8 is a screenshot of an example customer usage report of the MFP dashboard.

Referring now to FIG. 8, a customer usage screen 800 shows the total numbers of color and black-and-white devices, as well as the page count, for customer printing. The customer usage screen can include a color-coded customer usage area chart showing the relative sizes of the models of customer devices, as well as a customer usage map that show the geographic distribution of customer devices across the world, or in the customer's geographic areas.

In light of the foregoing, it should be appreciated that the present disclosure significantly advances the art of MFP operations. While example embodiments of the disclosure have been disclosed in detail herein, it should be appreciated that the disclosure is not limited thereto or thereby inasmuch as variations on the disclosure herein will be readily appreciated by those of ordinary skill in the art. The scope of the application shall be appreciated from the claims that follow.

What is claimed is:

1. A system comprising:
   a document processing engine;
   a network interface;
   an intelligent controller having a processor and associated memory,
      the memory storing cost data corresponding to device usage costs;
   a device monitor configured for monitoring, over time, of a plurality of device states and one or more initial device policy settings associated with the document processing engine;
   the processor configured to determine an initial return on investment in accordance the cost data and monitoring of the plurality of device states and initial device policy settings over time;
   the processor configured to modify one or more policy settings in accordance with a policy change request;
   the device monitor further configured to monitor, over time, the plurality of device states and one or more modified policy settings;
   an analytics engine configured for generation of a graphical dashboard illustrative of a change in return on investment in accordance with the cost data, monitored device states, monitored initial device policy settings and monitored modified policy settings; and
   a display generator configured to render an image of the graphical dashboard.

2. The system of claim 1 wherein the processor is configured to receive a system modification instruction via the network interface, and
   wherein the processor is further configured to reconfigure a multifunction peripheral associated with the controller in accordance with a received system modification instruction, and
   wherein the analytics engine updates the graphical dashboard display in accordance with monitored device states after reconfiguration of the multifunction peripheral.

3. The system of claim 2 wherein the modification instruction is comprised of an instruction to modify software on the multifunction peripheral.

4. The system of claim 1 further comprising a device state monitor, and wherein the analytics engine generates the graphical dashboard display in accordance with device state data received from the device state monitor.

5. The system of claim 4 wherein the analytics engine is further configured for ongoing receipt of device state data.

6. The system of claim 5 wherein the analytics engine is further configured to receive the device state data at preselected intervals.

7. A method comprising:
   storing, in a memory, cost data corresponding to device usage costs for a multifunction peripheral;
   monitoring, over time, a plurality of device states and one or more initial device policy settings associated with the multifunction peripheral;
   determining an initial return on investment in accordance with monitoring of the plurality of device states and initial device policy settings over time;
   modifying one or more initial device policy setting;
   monitoring, over time, the plurality of device states and one or more modified device policy settings;
   generating, via an analytical engine, graphical dashboard data illustrative of a change in return on investment in accordance with the cost data, monitored device states, monitored initial device policy settings and monitored modified device policy settings; and
   rendering an image of the graphical dashboard data on a display.

8. The method of claim 7 further comprising:
   receiving a system modification instruction via a network interface;
   reconfiguring the multifunction peripheral associated with the controller in accordance with a received system modification instruction; and
   updating, via the analytics engine, the graphical dashboard data in accordance with monitored device states after reconfiguration of the multifunction peripheral.

9. The method of claim 8 wherein the modification instruction is comprised of an instruction to modify software on the multifunction peripheral.

10. The method of claim 7 further comprising monitoring a device state of the multifunction peripheral and generating the graphical dashboard display data in accordance with device state data received from the device state monitor.

11. The method of claim 10 further comprising updating the graphical dashboard display data in accordance with for ongoing receipt of device state data.

12. The method system of claim 11 further comprising updating the graphical dashboard display data over selected intervals.

13. A system comprising:
   a memory storing cost data corresponding to device usage costs corresponding to a plurality of networked multifunction peripherals;
   a network interface configured to receive, into the memory, initial device state data corresponding to device states of each of the multifunction peripherals and initial device policy settings over time;
   the network interface further configured to receive, into the memory, modified device state data corresponding to device states of each of the multifunction peripherals and modified device policy settings over time; and
   a processor,
      the processor configured to apply analytics to generate graphical dashboard display data corresponding to changes in a return on investment between a return on investment associated with the initial device policy settings and return on investment associated with the modified device policy settings relative to the multifunction peripherals in accordance with device state data and the cost data, and
      the processor further configured to communicate the graphical dashboard display data to a user display terminal via the network interface.

14. The system of claim 13 wherein the memory further stores location data corresponding to locations of the multifunction peripherals, and wherein the graphical dashboard display data is generated to show device usage costs for groups of multifunction peripherals in each of a plurality of geographic regions.

15. The system of claim 14 wherein each of the geographic regions is associated with a dealer tasked with monitoring of a geographic region associated therewith.

16. The system of claim 13 wherein the device state data includes software installed on one or more of the multifunction peripherals, hardware installed on one or more of the multifunction peripherals, and configuration parameters on one or more of the multifunction peripherals.

17. The system of claim 13 wherein the device state data includes usage metrics associated with the multifunction peripherals.

18. The system of claim 13 wherein the network interfaces are further configured to receive device state data over each of a plurality of data reporting intervals.

* * * * *